L. H. & G. J. JONES.
HARVESTER.

No. 64,984. Patented May 21, 1867.

United States Patent Office.

LUMAN A. AND GEORGE J. JONES, OF BARRINGTON, NEW YORK.

Letters Patent No. 64.984. dated May 21, 1867.

IMPROVEMENT IN HARVESTERS.

The Schedule referred to in these Letters Patent and making part of the same.

TO ALL WHOM IT MAY CONCERN:

Be it known that we, LUMAN A. and GEORGE J. JONES, of Barrington, in the county of Yates, and State of New York, have invented a new and useful Improvement in Mowing and Seed-Gathering Machines; and we do hereby declare that the following is a full, clear, and exact description of the construction and operation of the same, reference being had to the annexed drawings, making a part of this specification, in which—

Figure 1:
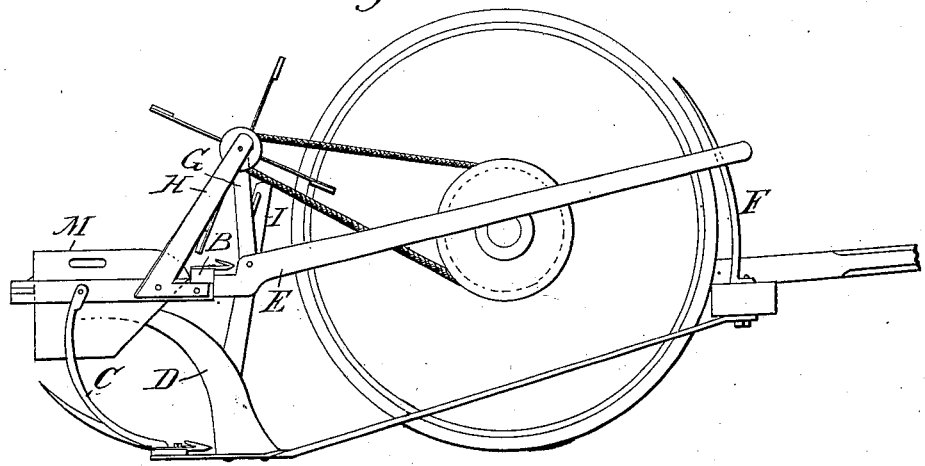
Figure 2:
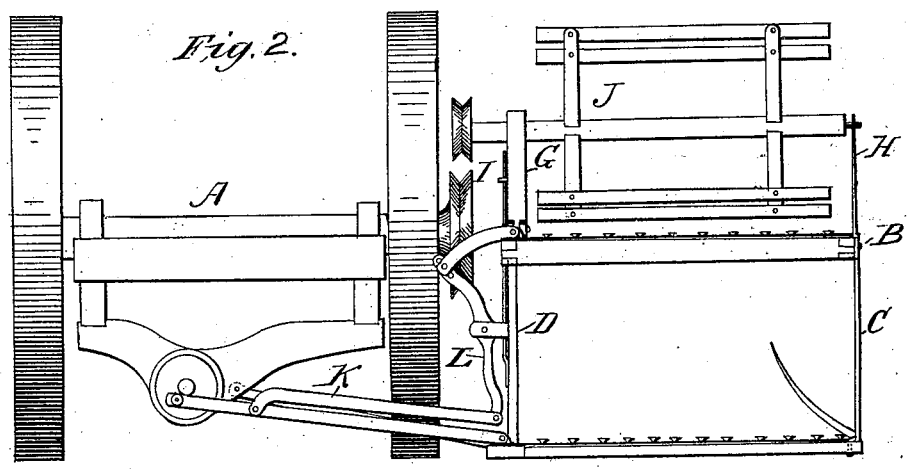

Figure 1 is a view of the right side.
Figure 2 a rear elevation with the seed-receptacle removed.
The letters of reference refer to the same parts in each figure.

The nature of our invention consists in making a seed-gathering mechanism and applying it to any kind of mower that is or may be used. Our invention is used for the purpose of cutting off and gathering the heads of grass and bolls of plants, and at the same time mowing the grass for fodder in the usual manner, thereby saving the seed without material injury to the grass when required for fodder.

To enable others skilled in the art to make and use our invention, we will proceed to describe its mode of construction and operation.

A is the mower to which our improvement is applied. This kind of mower may be used, or any other, without changing or altering any of the parts except for the purpose of fastening our improvement to it. B is the upper finger-bar, it is provided with guards and cutters of any ordinary construction, but cutters with a sickle edge are preferable. This bar is made with a framework behind it that will hold the receptacle for the bolls or seed; it is supported by the pieces C and D, and has them pivoted to it in such manner that the cutter-bar and finger-bar may be raised or lowered to suit the height of grass to be mowed, also be adjusted backward or forward so as to cut off the seed at the proper time before the grass is cut off at the surface of the ground. C and D are the supports that hold the cutter-bar and finger-bar above the lower finger-bar; they may be made any shape or curve desired; they are securely fastened to the lower finger-bar or its appendages, so that their motion will be the same as the finger-bar; they are pivoted to the framework that supports the upper finger-bar B. E is a lever attached to the side of the frame that supports the upper cutter-bar and seed-receptacle, or it may be made by extending one of the side pieces of the frame forward of the wheel, as shown in fig. 1. F is a sustainer for the forward end of the lever E; it may be provided with notches, catches, or any other device that will hold the end of the lever, so that by raising or lowering the lever the upper finger-bar B may be adjusted to the length of the grass. G is one of the supports for the reel; it is attached to the lever E with a movable joint for the purpose of allowing the upper end to be moved backward or forward so as to keep the band that drives the reel tight when the end of the lever E is raised or lowered. H is the support for the outer end of the reel; it may be made in shape as represented in fig. 1, or any other, and fastened to the upper finger-bar or the frame that sustains it. I is a standard fastened to the support D; its use is to guide the rail-post G, and for this purpose it has a long mortise parallel with its edge for a pin or bolt that projects from the reel-post to move up or down freely, so that the lever E may be raised or lowered, and the driving-belt of the reel will be equally tight in all positions of the lever. J is the reel, made and driven in the ordinary manner; it may be necessary to put more arms and bars, or it may be provided with a kind of brush on the bars, and it must be so adjusted that it will conduct the heads of grass to the cutters and move the cut-off heads backward into the receptacle.; the reel is driven by a belt from the pulley on the axle of the mower, as shown in fig. 1. K is an additional connection; it is pivoted to the connection that drives the lower cutter-bar, as shown in fig. 2; its use is to actuate the lever L. L is a lever that actuates the upper cutter-bar; it is provided with a connection from its upper end to the cutter-bar, as shown in fig. 2; it may be provided with a series of pivot holes for the purpose of changing the motion of the cutter-bar. This lever is supported by a fulcrum that is fastened to the support D, as represented in the same figure. M is a receptacle for the bolls or seed; it is the same length as the upper finger-bar, and in shape as represented in fig. 1; its size may be varied to suit any requirement; it is supported by a framework made in connection with the upper finger-bar; its use is to receive the bolls or seed, and when it is filled it may be taken out and emptied and be replaced to be filled again.

Having thus fully described our invention, what we claim as new, and desire to secure by Letters Patent, is—

The arrangement of the several parts B, C, D, E, G, J, K, L, and M, when made and applied as and for the purpose herein specified.

LUMAN A. JONES,
GEORGE. J. JONES.

Witnesses:
JOHN L. LEWIS,
CHARLES KETCHUM.